July 26, 1960 R. P. BOUTILLETTE 2,946,084
SKINNING DEVICES
Filed July 3, 1958
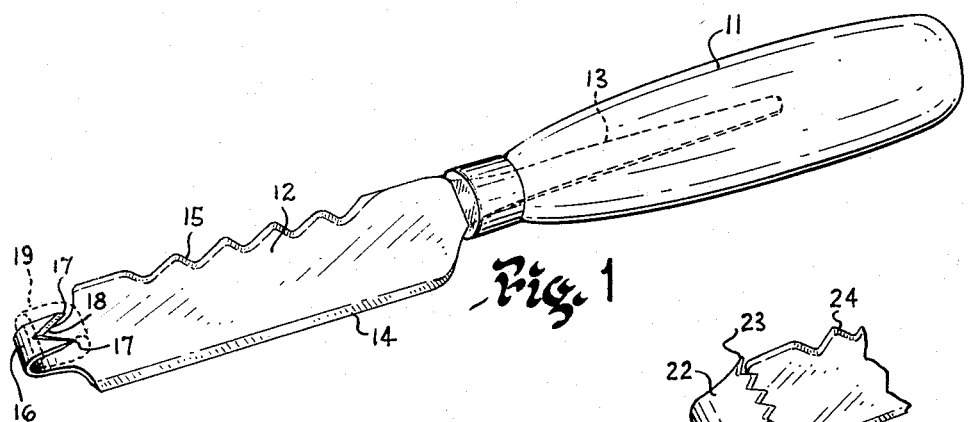
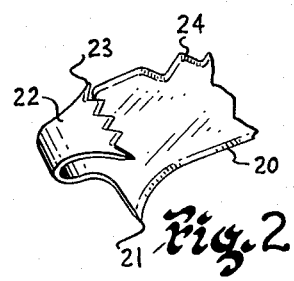
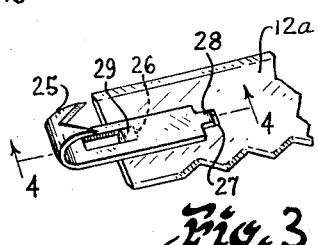
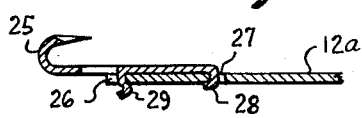
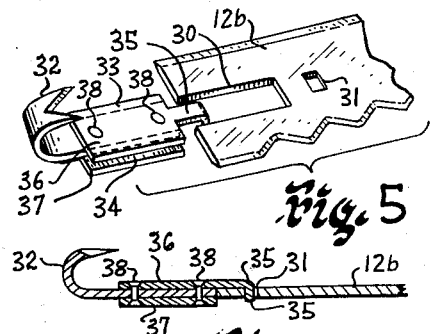
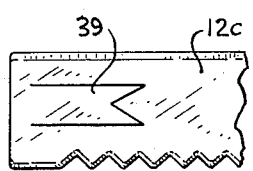
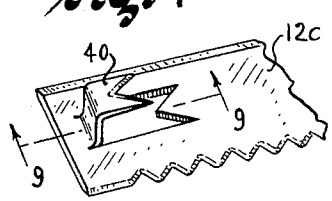
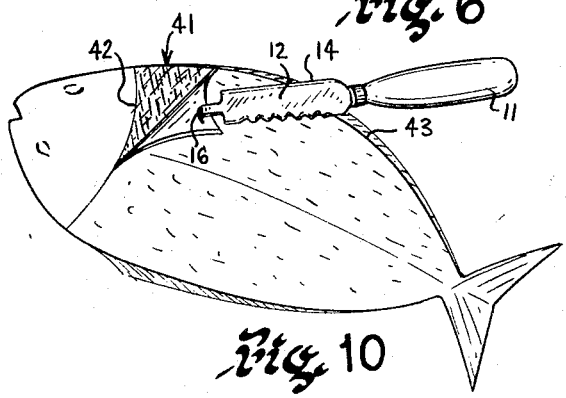
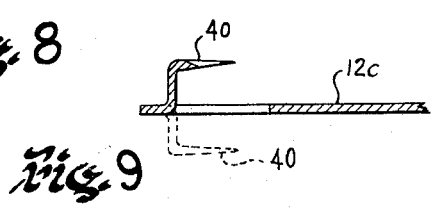
INVENTOR.
RAYMOND P. BOUTILLETTE
BY
*Louis L. Gagnon*
ATTORNEY

United States Patent Office 2,946,084
Patented July 26, 1960

2,946,084

SKINNING DEVICES

Raymond P. Boutillette, 239 High St., Webster, Mass.

Filed July 3, 1958, Ser. No. 746,459

3 Claims. (Cl. 17—7)

This invention relates to improvements in skinning devices and has particular reference to novel means and method of making the same.

One of the principal objects of the invention is to provide a simple and inexpensive skinning device and method of making the same adapted particularly for use in cleaning and removing the skin from the main body portion of a fish or the like.

Another object is to provide a tool having a blade portion formed longitudinally of a side thereof with a sharp cutting edge and along its opposed longitudinal side with a serrated edge and having a sidewise deflected hook portion adjacent its outer end.

Another object is to provide right and left-handed blade portions of the above character.

Another object is to provide a bladelike portion of the above character having a detachable and reversible hooklike member on its outer edge and novel method of making the same.

Another object is to provide a blade having a handle on one end thereof, a relatively sharp longitudinal edge along one side thereof, a serrated edge along the opposite longitudinal side thereof and a sidewise deflected hooklike portion on its end opposite the handle and method of making the same.

Other objects and advantages of the invention will become apparent from the following description taken in conjunction with the accompanying drawings wherein:

Fig. 1 is a perspective view of one embodiment of the invention;

Fig. 2 is a fragmentary view of a modified form of the invention;

Fig. 3 is a view similar to Fig. 2 of another modification;

Fig. 4 is a sectional view taken as on line 4—4 of Fig. 3 and looking in the direction indicated by the arrows;

Fig. 5 is an exploded view generally similar to Fig. 2 of a further modification of the invention;

Fig. 6 is a sectional view similar to Fig. 4 of the modification illustrated in Fig. 5 showing the parts inassembled relation with each other;

Fig. 7 is a fragmentary plane view of a further modification;

Fig. 8 is a fragmentary perspective view of the modification illustrated in Fig. 7;

Fig. 9 is a sectional view taken as on line 9—9 of Fig. 8; and

Fig. 10 is a view diagrammatically illustrating one use of the device of the invention.

Referring more particularly to the drawings wherein like characters of reference designate like parts throughout the various views, one of the devices embodying the invention comprises a handle 11 having a blade 12 attached thereto by a suitable shank portion 13. The blade 12 embodies a longitudinal cutting edge 14 on one side thereof and a longitudinal serrated edge 15 on the opposed side thereof and has a sidewise deflected hooklike portion 16 formed integral with the end thereof. The hooklike portion 16 preferably has a base portion of a width much less than the width of the blade extending outwardly substantially in the plane of the blade and thence curves in a sidewise and rearward direction in an arc of substantially ¼" radius and is provided with spaced pointed prongs 17 formed by providing a V-shaped recess 18 in the rearwardly disposed end of said hooklike portion. The serrated edge has its serrations beveled in an outward direction so that the said serrated edge may be formed relatively sharp if desired.

The above device is adapted primarily for use in cleaning or removing the skin from fish, such as diagrammatically illustrated in Fig. 10. The fish may be scaled by the serrated edge 15, or the skin may be cut at selected locations by the longitudinal sharp edge 14 and thereafter removed by use of the hooklike portion 16, by first loosening a section of the skin and hooking said pointed ends into the skin and exerting a pulling force thereon.

It is particularly pointed out that the device of Fig. 1, in order to protect the individual utilizing the same during the scaling or cutting operations may have a protective removable cap of rubber or other suitable material, illustrated by the dash lines 19, removably fitted over the hooklike portion 16. However, the hookline portion 16 for a right-handed person may be deflected in one sidewise direction in order to insure against possible injury by the hooklike portion during the scaling or cutting operation or deflected in the opposite direction for a left-handed person so that the said hooklike portion may be disposed in a downward direction particularly during said cutting operation.

In Fig. 2 there is illustrated a modification of the invention wherein the cutting edge 20 is provided with an outwardly disposed cutting end 21 and the hooklike portion 22 is provided with a plurality of pointed end portions 23 instead of having only the two pointed ends 17 as illustrated in Fig. 1. The blade in this instance is also provided with a serrated edge 24 similar to the serrated edge 15.

In Figs. 3 and 4 there is illustrated a further modification wherein the hooklike portion 25 may be detachably connected with the blade 12a of the device. In this instance the blade 12a is provided with a notch 26 in the forward end thereof and with an opening 27 spaced inwardly from said notched forward end. The hooklike portion 25, in this instance, is provided with a rear foot having a sidewise deflected end portion 28 adapted to be extended through the opening 27 and be latched with the blade and is further provided with a spring-latch portion 29 adapted to be fitted into the notch 26 and to clampingly grip the base of the notch to hold the hooklike portion 25 in connected relation with the blade. This is to permit the hooklike portion to be disposed outwardly to either side of the blade 12a as desired, to accommodate for right or left-handed persons. It is to be understood that the hooklike portion may or may not be provided with a protective cap such as shown at 19 and described above.

In Figs. 5 to 6 there is shown a further modification wherein the blade 12b is provided with a relatively deep end notch 30 and an opening 31 spaced inwardly of the base of the notch. In this instance the hooklike portion 32 is provided with an intermediate portion 33 having longitudinal channels 34 in the opposed side edges thereof which are adapted to be fitted inwardly of the notch 30 with the channels straddling the opposed sides of the notch and further having a spring latch 35 adapted to engage within the opening 31 to hold the hooklike portion in connected relation with the blade 12b. The channels may be formed by securing plates 36 and 37 of a width greater than the width of the hooklike portion 32 to said hooklike portion by rivets or the like 38 or by any other suitable means and with one of said plates being formed with the spring latch portion 35.

A further modification is shown in Figs. 7 through 9 wherein the blade 12c may have an integral portion 39 of the contour shape desired of the hooklike portion 40 to be formed by a suitable blanking and cutting operation at a location spaced inwardly of the forward end of the blade, as diagrammatically illustrated in Fig. 7, and the said hooklike portion 40 may thereafter be formed to extend outwardly of either side of the blade 12c, as diagrammatically illustrated in Figs. 8 and 9, by bending said portion 39 in a sidewise direction and to the shape desired of the hooklike portion 40.

It is particularly pointed out that the hook-shaped member 39 may be first bent toward the free end of the blade and thence turned upwardly and rearwardly in an arc so as to dispose said hook-shaped member more nearly adjacent the end of the blade or may be bent so as to extend outwardly of the blade and thence turned in a sidewise and rearward direction to complete the hook. In each instance the hook-shaped ends of the various modifications are beveled to provide relatively sharp points with the said hook-shaped members being of a width considerably less than the width of the blade with the exception of the modification illustrated in Fig. 2.

In Fig. 10 there is a diagrammatic illustration of one use of the device, namely, that of removing the skin from a fish 41 wherein a cut 42 may be formed by the sharp edge 14 or other similar edge rearwardly of the head of the fish, a further cut 43 may be made longitudinally of the back of the fish and the hooklike portion 16 or similar hook-shaped portion may be thereafter forced beneath the point of intersection of said cuts 42 and 43 adjacent the upper rear portion of the head with the prongs 17 engaging with the flesh whereby a pulling action on the device will cause the skin to be drawn from the main body portion of the fish.

It will be seen from the above description that simple, economical and efficient means and method have been provided for accomplishing all of the objects and advantages of the invention. While the invention has been illustrated particularly for use in removing the skin from fish, it is to be understood that it may be adapted to any other similar uses, all of which are within the scope of the invention.

Having described my invention, I claim:

1. A skinning device of the character described comprising the combination of a relatively long and narrow blade portion having a sidewise deflected and angularly rearwardly extending hooklike portion detachably connected to said blade adjacent one end thereof and having spaced pointed prongs on its end and a handgrip portion on the opposed end of said blade.

2. A skinning device of the character described comprising the combination of a relatively long and narrow flat blade portion having a longitudinal sharp edge portion on one side thereof, said blade portion having a notch in one end thereof and an opening spaced inwardly of said notch, a member having a sidewise deflected reversely extending hooklike portion with spaced pointed prongs on the end thereof and further having means engaging in said notch and means engaging in said opening to detachably connect said member to said blade and said blade having a handgrip portion on its opposed end.

3. A skinning device of the character described comprising the combination of a relatively long and narrow thin blade portion lying in a relatively flat single plane having a longitudinal outwardly tapering sharp edge portion along one side thereof, a serrated edge along its opposed side and having a terminal end of a width less than the width of said blade portion extending outwardly intermediate said opposed edge portions of said blade with a portion thereof lying in the plane of said blade portion and the remainder thereof curving outwardly and inwardly in a rearward direction and terminating in a bifurcated hooklike portion having spaced relatively pointed ends and a handgrip portion secured to the opposed end of said blade portion.

References Cited in the file of this patent

UNITED STATES PATENTS

| | | |
|---|---|---|
| 342,884 | Stone | June 1, 1886 |
| 2,066,803 | Sawyer | Jan. 5, 1937 |
| 2,243,127 | Roseman | May 27, 1941 |
| D. 162,777 | Berger et al. | Apr. 10, 1951 |